(12) United States Patent
Rinehart

(10) Patent No.: US 11,277,415 B1
(45) Date of Patent: Mar. 15, 2022

(54) CREDENTIAL RENEWAL CONTINUITY FOR APPLICATION DEVELOPMENT

(71) Applicant: Rapid7, Inc., Boston, MA (US)

(72) Inventor: Michael Robert Rinehart, Naperville, IL (US)

(73) Assignee: Rapid7, Inc., Boston, MA (US)

(*) Notice: Subject to any disclaimer, the term of this patent is extended or adjusted under 35 U.S.C. 154(b) by 377 days.

(21) Appl. No.: 16/411,243

(22) Filed: May 14, 2019

(51) Int. Cl.
H04L 29/06 (2006.01)
H04L 9/08 (2006.01)
H04L 67/133 (2022.01)

(52) U.S. Cl.
CPC .......... *H04L 63/108* (2013.01); *H04L 9/0891* (2013.01); *H04L 63/102* (2013.01); *H04L 63/1491* (2013.01); *H04L 67/40* (2013.01)

(58) Field of Classification Search
None
See application file for complete search history.

(56) References Cited

U.S. PATENT DOCUMENTS

| | | | | |
|---|---|---|---|---|
| 10,666,657 | B1* | 5/2020 | Threlkeld | H04L 63/20 |
| 2015/0074408 | A1* | 3/2015 | Oberheide | H04L 9/083 |
| | | | | 713/171 |
| 2016/0036837 | A1* | 2/2016 | Jain | H04L 63/1416 |
| | | | | 726/23 |
| 2019/0215375 | A1* | 7/2019 | Ragsdale | H04L 67/26 |
| 2019/0286735 | A1* | 9/2019 | Labian | G06F 16/258 |
| 2019/0312860 | A1* | 10/2019 | Dykes | H04L 63/10 |
| 2019/0318122 | A1* | 10/2019 | Hockey | H04L 63/0853 |
| 2020/0137105 | A1* | 4/2020 | Endler | H04L 63/083 |

* cited by examiner

*Primary Examiner* — Arezoo Sherkat
(74) *Attorney, Agent, or Firm* — Ashwin Anand (57) ABSTRACT

Disclosed herein are methods, systems, and processes for continuously renewing credentials in application development and testing environments that include application products from third-party vendors. A notification indicating that an existing credential associated with a developer account of a third-party application will expire is received via a webhook. A credential renewal request for a new set of credentials for the developer account is sent using a request method specified for the third-party application and the new set of credentials for the developer account are received within the expiration period via the webhook.

15 Claims, 10 Drawing Sheets

Credential Management Table 405

| Application Field 410 | Credential Field 415 | "In Expiration Window?" Field 420 | "Integrated Renewal?" Field 425 | "Credential Compromised?" Field 430 | Security Action Field 435 |
|---|---|---|---|---|---|
| 160(1) | 150(1) | Yes | Yes; Receive | Yes | Prepone receiving new credential |
| 160(2) | 150(2) | Yes | No; Get | Yes | Block access to application; Re-direct to honeypot |
| 160(3) | 150(3) | No | Yes | No | No action |
| 160(4) | 150(4) | No | Yes | Yes | Pause application I/O, Adjust expiration window |
| 160(5) | 150(5) | Yes | No; Get | No | No action |
| ... | ... | ... | ... | ... | ... |

CREDENTIAL RENEWAL CONTINUITY FOR APPLICATION DEVELOPMENT

BACKGROUND

Field of the Disclosure

This disclosure is related to cybersecurity computing systems. In particular, this disclosure is related to automatic renewal of credentials in application development and testing computing environments.

Description of the Related Art

Application development and testing is a software development process that involves synchronized implementation of a broad spectrum of defect prevention and detection strategies in order to reduce software development risks, time, and costs. Application development and testing includes static code analysis, data flow analysis, metrics analysis, peer code review, unit testing, code coverage analysis, traceability, and the like.

In modern application development and testing environments, testing is (and often needs to be) simultaneously performed on various interconnected applications and/or application components, hosted locally or on third-party servers. Enabling such interconnected functionality to test and develop complex applications (e.g., web applications) requires (the constant and consistent availability of) valid Application Programming Interface (API) keys or credentials for developer accounts for third-party vendor products and APIs.

The technological problem of expired credentials is prescient in developer lab environments. Expired credentials cause service and product automation or usage of those (expired) credentials and applications to fail, adding significant downtime and redundancy to the application development and testing process (e.g., to manually retrieve new credentials each time one is found to have expired). In addition, existing credential renewal mechanisms can also introduce cybersecurity-related risks to the application development and testing process by exposing sensitive application components to malicious actors while credentials are in the process of being renewed after inadvertent expiration.

SUMMARY OF THE DISCLOSURE

Disclosed herein are methods, systems, and processes to automatically renew credentials in application development and testing environments. One such method involves receiving, via a webhook, a notification indicating that an existing credential associated with a developer account of a third-party application will expire within an expiration period. A credential renewal request for a new set of credentials for the developer account is sent using a request method specified for the third-party application and the new set of credentials for the developer account are received via the webhook within the expiration period.

In one embodiment, the method involves determining that the third-party application is unintegrated, receiving an input including the expiration period for the existing credential, processing a credential renewal form for the third-party application, and sending the credential renewal request requesting the new set of credentials a pre-determined amount of time before the expiration period ends. In this example, the new set of credentials are received via an Application Programming Interface (API) and stored in the developer account, the request method comprises POST, and the expiration period is received when the existing credential is created.

In certain embodiments, the method involves determining that the existing credential has been compromised, generating a honeypot with an instantiation of the third-party application, sending a request to re-direct network traffic sent to the third-party application using the existing credential to the instantiation of the third-party application in the honeypot for remainder of the expiration period, and causing access to be permitted to the third-party application only after the new set credential have been received within the expiration period.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern application development and testing (e.g., in a developer lab environment) often requires the simultaneous testing of disparate applications and application components that may be hosted locally or may be dispersed across various geographically disparate application or web servers, cloud storage devices, virtual machines, and other types of distributed computing infrastructure (e.g., third-party servers). Successfully facilitating such interconnected functionality with a multitude of application (and component) dependencies (e.g., during web application development, and the like) requires the constant and consistent availability of valid (and active) Application Programming Interface (API) keys (e.g., credentials) for developer accounts (e.g., for third-party vendor products and APIs).

An API key is a code passed in by computer programs calling an API to identify the calling program, the developer of the calling program (e.g., as discussed herein), or the user of the calling program (e.g., to a given website). API keys are used to track and control how the API is being utilized and implemented, for example, to prevent malicious use or abuse of the API itself (e.g., as per terms of service, and other such provisions). The API key can often function as both a unique identifier and as a secret token for authentication and validation, and typically involves a set of access rights on the API. For example, API keys can be based on a universally unique identifier (UUID) to ensure uniqueness (e.g., to each developer).

As previously noted, the technical and computing problem of inadvertently expired credentials in such developer lab environments can result in significant downtime as well as substantial cybersecurity risks. Unintentionally expired credentials in application development and testing environments with hundreds if not thousands of application components and their various API-related dependencies can cause service and product automation or even the utilization of those (expired) credentials and application to fail, adding significant downtime and redundancy in time constrained developer lab environments by first requiring a developer to realize that a required credential for API access has expired upon failure of a corresponding application dependency and then encumbering the developer with a burdensome requirement to manually request and retrieve new credentials each time one is found to have inadvertently expired.

What's more, inadvertently expired credentials (and the non-realization of such expiration until failure thereof) present a significant cybersecurity risk in developer lab environments. The time period between a credential expiring and the time required to realize such expiration (which, as noted, often occurs when a service or automation that requires the inadvertently expired credentials undoubtably fails) let alone the time required to request and receive new replacement credentials (which can run into days and even weeks) can be a dangerous and potent time period for malicious attacks.

For example, expired credentials themselves are easier to compromise than valid credentials at least because expired credentials are not actively used (and therefore, not typically proactively monitored by behavior-based or usage-based cybersecurity measures) and also because there is no mechanism to immediately authenticate the expired credential as valid (e.g., unless and until a new credential is received for the failed application service, automation, or other component or dependency associated with the expired credential). Malicious actors like hackers can insert malicious code or other types of malware into application code during this vulnerability window unintentionally exposed by inadvertently expired credentials in developer lab environments.

Disclosed herein are methods, systems, and processes to automatically renew credentials or API keys associated with developer accounts in application development and testing environments. Seamlessly renewing credentials in this manner without the need for human or developer intervention in developer lab environments not only mitigates unplanned, costly, and onerous downtime with respect to application usage that revolves around consumption of third-party vendors and products, but also leads to substantial cost savings (both in terms of human resources and financial capital).

In addition, the methods, systems, and processes disclosed herein also ameliorate cybersecurity-related risks caused (or exposed) by inadvertently expired credentials in developer lab environments, as noted above (e.g., by periodically refreshing credentials, proactively dealing with compromised credentials, and the like). Continuous renewal of credentials and API keys prior to expiration in application development also leads to robust functioning of collaborative and dispersed developer lab environments and permits developers to confidently incorporate third-party vendor products without being caught off-guard by unexpected failures.

Example Credential Management Server

Figure 1:
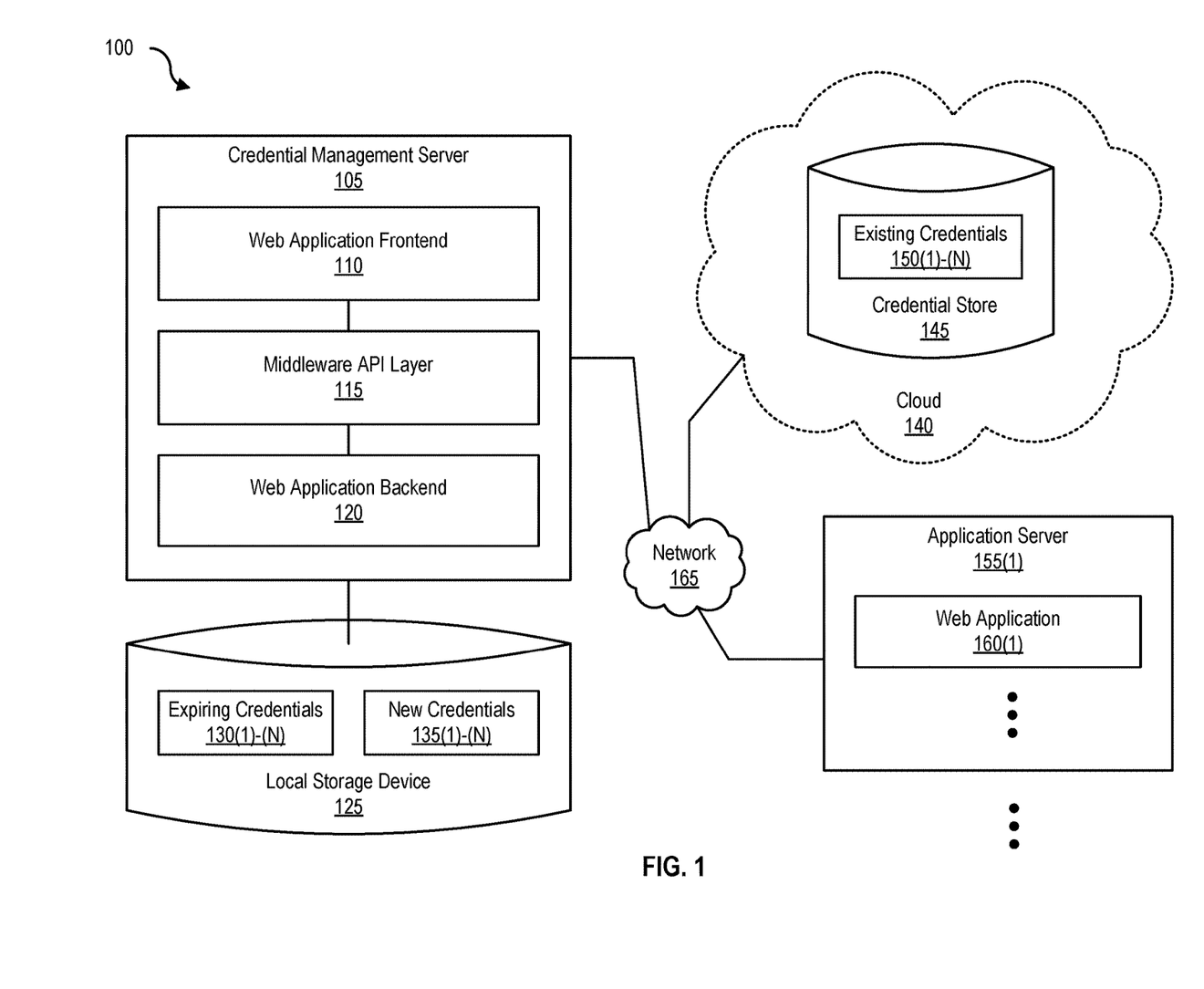
FIG. 1 is a block diagram 100 of a credential management server, according to one embodiment of the present disclosure.

FIG. 1 is a block diagram 100 of a credential management server 105, according to one embodiment. Credential management server 105, which can be any type of physical or virtual computing device, includes at least a web application frontend 110, a middleware Application Programming Interface (API) layer 115, and a web application backend 120. Web application frontend 110, middleware API layer 115, and web application backend 120 are discussed in greater detail with respect to FIGS. 2A, 2B, and 2C, infra.

Credential management server 105 is communicatively coupled to a local storage 125, which can be any type of volatile or non-volatile storage device. Local storage 125 includes expiring credentials 130(1)-(N) and new credentials 135(1)-(N). Existing credentials 130(1)-(N) are credentials or API keys associated with web applications (or services, dependencies, and/or components thereof) that are scheduled for expiration within a predetermined time period (e.g., within 10 days, and the like). New credentials 135(1)-(N) are credentials or API keys that are received from a third-party vendor (e.g., of one or more web applications) to replace corresponding expiring credentials 130(1)-(N).

Credential management server 105 is also communicatively coupled to a cloud 140 and one or more application servers (e.g., application server 155(1)). Cloud 140 is a data center that provides on-demand availability of data storage and computing power (e.g., to provision application server 155(1) and a web application 160(1), to store existing credentials 150(1)-(N) on a credential storage 145, and the like). Credential management server 105, cloud 140, and application server 155(1) are communicatively coupled by a network 165, which can be any type of network or interconnection (e.g., the Internet, and the like).

Existing credentials 150(1)-(N) stored by credential store 145 include credentials or API keys (expired, expiring soon, or otherwise) that are required to successfully develop and/or test one or more web applications (e.g., web applications 160(1)-(N)). The developer lab environment shown in FIG. 1 requires the continuous renewal (and validity) of existing credentials 150(1)-(N) to ensure that application services, automation, features, and/or dependencies do not unexpectedly fail during the application development and testing process due to the inadvertent expiration of one or more existing credentials 150(1)-(N).

In one embodiment, credential management server 105 maintains credentials or API keys for developer accounts (e.g., existing credentials 150(1)-(N)) for third-party vendor products and APIs (e.g., web application 160(1) including services, automation, features, and/or dependencies of web application 160(1) for which valid and promptly renewed credentials or API keys are required) on credential store 145 in cloud 140. In this example, application server 155(1) and web application 160(1) are third-party vendor products (that are part of and/or required for an application development and testing process or an operation thereof) whose credentials (e.g., existing credential 150(1)-(N)) are periodically refreshed.

Example Web Application Frontend for Continuous Credential Renewal

Figure 2A:
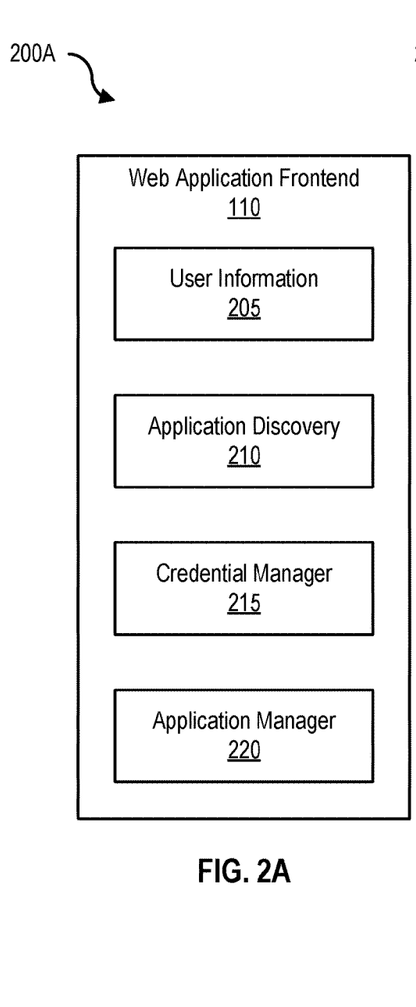
FIG. 2A is a block diagram 200A of a web application frontend, according to one embodiment of the present disclosure.

FIG. 2A is a block diagram 200A of web application frontend 110 that supports credential management capabilities for a user, according to one embodiment. Web application frontend 110 permits users of credential management server 105 (e.g., users such as developers who require access to third-party credentials or API keys) to manage their developer lab environments and includes at least user information 205, application discovery 210, a credential manager 215, and an application manager 220.

In one embodiment, user information 205 includes information about one or more developer accounts (e.g., name of the developer account, applications or services, features, automation, and/or dependencies required (or accessed) by a developer of the developer account, length of credential validity for the developer account, and the like) and facilitates single-step (application) registration and credential renewal. In another embodiment, application discovery 210 (e.g., third-party vendor and product discovery) enables vendors (e.g., the owner or user of application server 155(1)) to promote their products (e.g., web application 160(1)) and also permits product discovery by credential management server 105.

In some embodiments, application discovery 210 utilizes user-provided information from user information 205 to automate (or auto-fill) registration forms necessary for application credential acquisition and renewal. In other embodiments, credential manager 215 manages third-party product credentials and associated information (e.g., expiration dates, and the like) and application manager 220 manages the addition of third-party products (e.g., other web applications) to be managed by credential management server 105.

Example Middleware API Layer for Continuous Credential Renewal

Figure 2B:
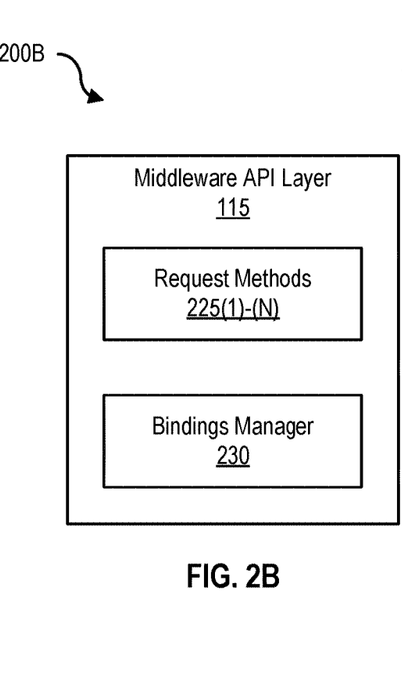
FIG. 2B is a block diagram 200B of a middleware API layer, according to one embodiment of the present disclosure.

FIG. 2B is a block diagram 200B of middleware API layer 115 that is an API layer component of credential management server 105 that permits users of credential management server 105 to automate access to their third-party product credential stores (e.g., credential store 145 in cloud 140), according to one embodiment. Middleware API layer 115 includes at least request methods 225(1)-(N) and a bindings manager 230.

In one embodiment, middleware API layer 115 facilitates the use of a request method 225(1) (e.g., a Hypertext Transfer Protocol (HTTP) method such as POST, among others) to administer and manage existing credentials 150 (1)-(N), expiring credentials 130(1)-(N), and new credentials 135(1)-(N) (e.g., automatically and continuously obtaining new (renewed) credentials, updating existing or expiring credentials, and the like).

In another embodiment, bindings manager 230 facilitates the writing of bindings against a developer lab environment and credential management server 105 (e.g., by a developer or user of credential management server 105) to maintain credentials (e.g., existing credentials 150(1)-(N)) in a constantly renewed state (e.g., such that the credentials can be accessed by application processes, tests, and the like) by accepting a crafted request (e.g., from a user of applications server 155(1)) to return credentials. For example, a customized script to retrieve or pull credentials from credential store 145 can be inserted into a Python script each month (or per some other time period) to ensure that the Python script continues to execute without issue due to inadvertently expired credentials.

Example Web Application Backend for Continuous Credential Renewal

Figure 2C:
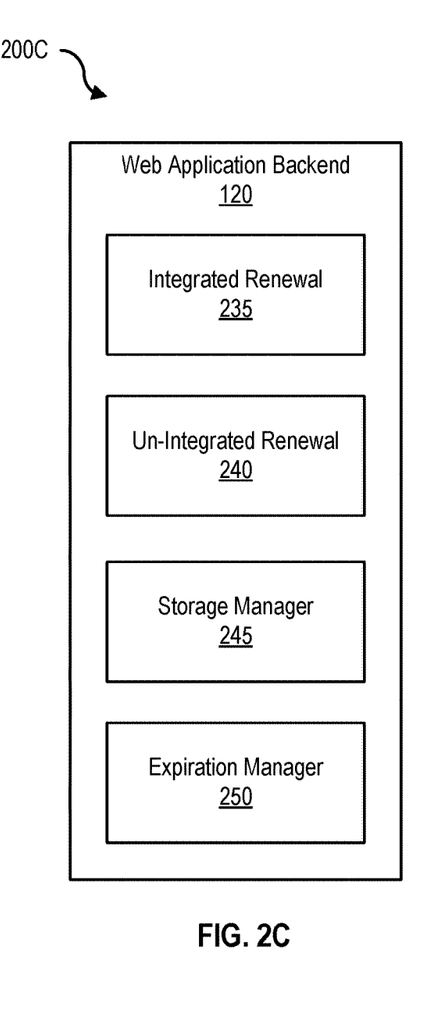
FIG. 2C is a block diagram 200C of a web application backend, according to one embodiment of the present disclosure.

FIG. 2C is a block diagram 200C of web application backend 120 that supports credential renewal against third-party vendor products (e.g., web application 160(1), and the like), according to one embodiment. Web application backend 120 includes at least integrated renewal 235, un-integrated renewal 240, a storage manager 245, and an expiration manager 250 and performs product credential renewal (for applications integrated as well as not integrated with credential management server 105) and storage of credentials, once renewed, in a developer account. These concepts are discussed in greater detail with respect to FIG. 3A, infra.

Figure 3A:
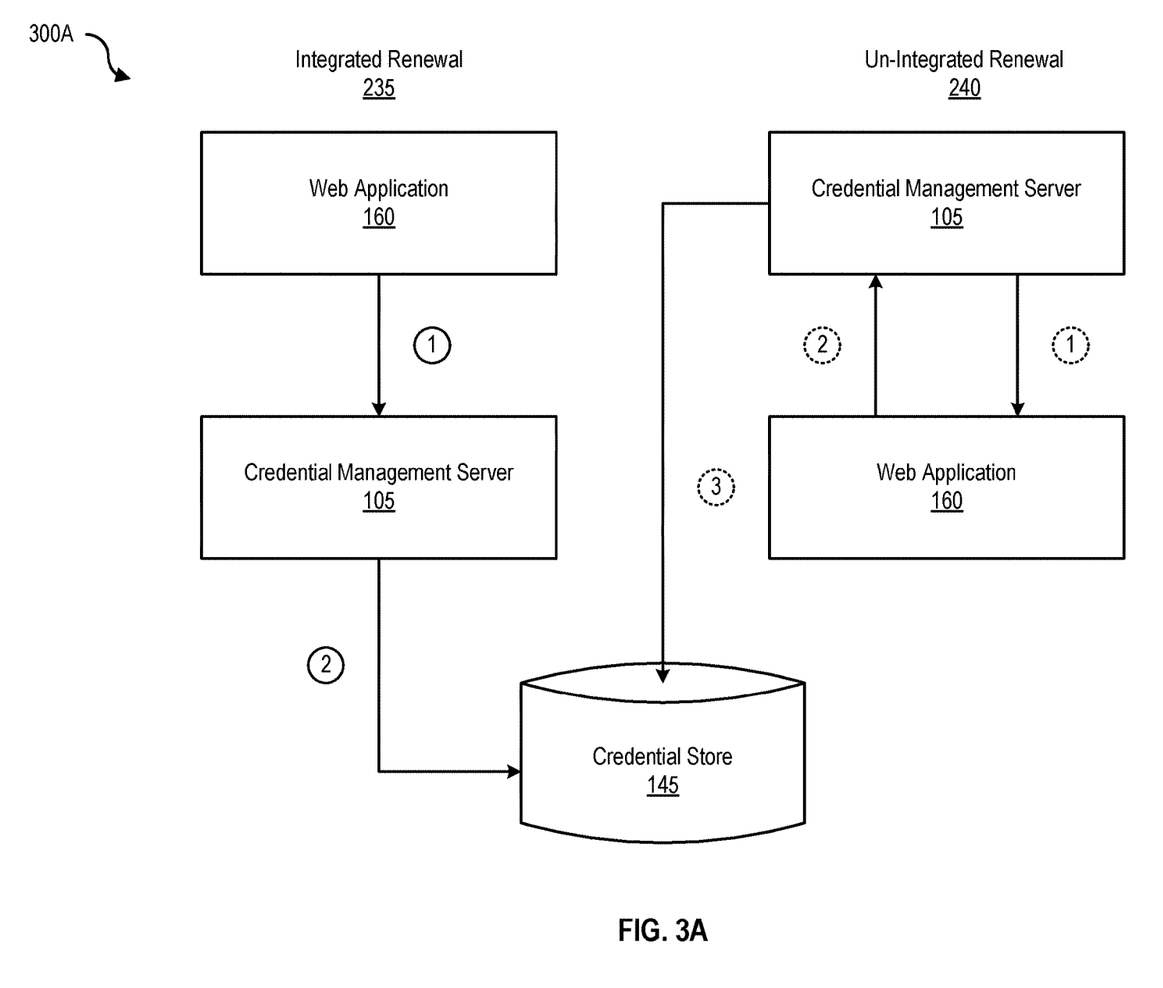
FIG. 3A is a block diagram 300A of an integrated and a non-integrated credential renewal system, according to one embodiment of the present disclosure.

FIG. 3A is a block diagram 300A of an integrated and a non-integrated credential renewal system, according to one embodiment. In some embodiments, product credential renewal is performed in at least two varying manners depending on whether a given application is integrated or non-integrated with credential management server 105. If integrated renewal 235 determines that a web application 160 is integrated with credential management server 105, credentials are received via a webhook from web application 160 (e.g., a third-party product) at credential management server 105 (shown as solid/circular 1 in FIG. 3A), permitting integrated renewal 235 in credential management server 105 to seamlessly obtain new credentials and update developer accounts associated with those (new/renewed/updated) credentials.

For example, expiration manager 250 receives, via a webhook, a notification indicating that an existing credential (e.g., existing credential 150(1)) associated with a developer account of a third-party application (e.g., web application 160) will expire within an expiration period (e.g., two weeks). Integrated renewal 235 generates and transmits a credential renewal request for a new (e.g., renewal or updated) set of credentials for the developer account using a request method (e.g., request method 225(1)) specified for the third-party application. The new set of credentials for the developer account are received via the webhook within the expiration period and storage manager 245 stores the new credentials in the developer account (e.g., in credential store 145 shown as solid/circular 2 in FIG. 3A).

In one embodiment, un-integrated renewal 240 determines that web application 160 is unintegrated (e.g., with credential management server 105). In this example, expiration manager 250 receives an input (shown as dotted/circular 1 in FIG. 3A) that includes an expiration period for an existing credential (e.g., an expiration that is received from a third-party vendor when the existing credential is created). Un-integrated renewal 240 processes a credential renewal form for web application 160 (e.g., scrapes the credential renewal form for fields that are required for submission) and sends (or transmits) the credential renewal request (e.g., to a third-party application server like application server 155(1)), requesting the new set of credentials a pre-determined amount of time before the expiration period ends (e.g., one week, to ensure that there is ample time between credentials expiring and credentials being renewed). The new set of credentials are received via an API (shown as dotted/circular 2 in FIG. 3A) and stored in the developer account (shown as dotted/circular 3 in FIG. 3A).

In one embodiment, credential management server 105 implements webhooks to augment or alter the behavior of web application 160(1) with custom credential renewal callbacks. In this example, these credential renewal callbacks are maintained, modified, and managed by third-party (application) vendors and developers who are not affiliated with or connected to the management of credential management server 105 and/or cloud 140 (e.g., an originating server). For another embodiment, the format for the webhook is JavaScript Object Notation (JSON) and the request method is a HTTP POST request. In this example, the webhook includes information about the credential renewal request event and a signature to verify the webhook.

As noted, webhooks are user-defined HTTP callbacks and are triggered by an event (e.g., pushing code to a repository, a comment posted to a blog, and the like). When that event occurs, a source site makes an HTTP request to a Uniform Resource Locator (URL) configured for the webhook and users can configure the webhook to cause events on a given site to invoke behavior on another site. Therefore, in certain embodiments, credential management server 105 utilizes webhooks for continuous and seamless credential and API key renewal. In this example, webhooks are triggered by a credential expiration period notification, include one or more expiring credentials (e.g., expiring credential 130(1)-(N)) and cause application server 155(1) to transmit new, updated, or renewed credentials (associated with and corresponding to the one or more expiring credentials) back to credential management server 105.

Examples of Neutralizing Compromised Credentials During Credential Renewal

Figure 3B:
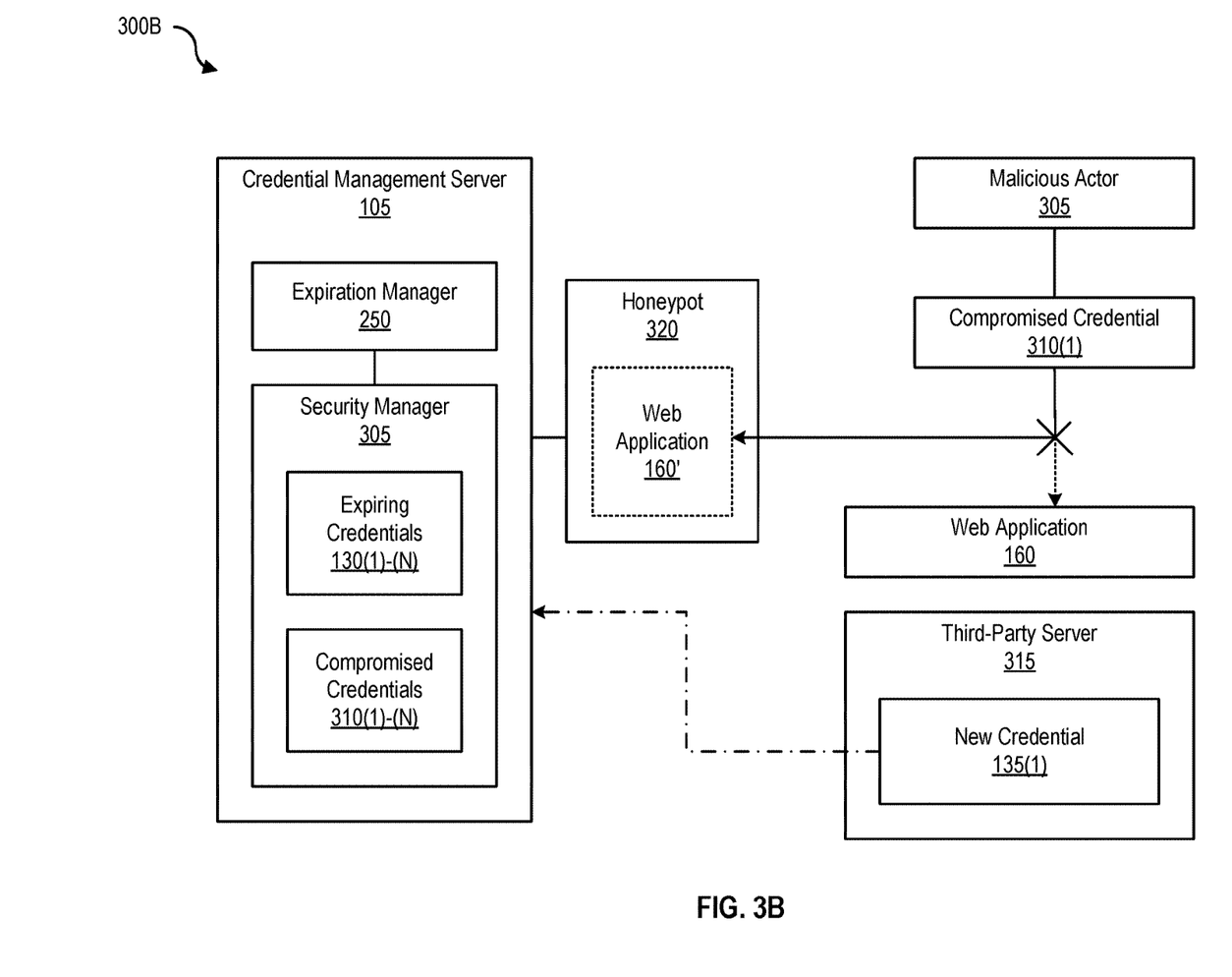
FIG. 3B is a block diagram 300B of a security manager implemented in a credential management server, according to one embodiment of the present disclosure.

FIG. 3B is a block diagram 300B of a security manager 305 implemented in credential management server 105, according to one embodiment. As shown in FIG. 3B, credential management server 105 includes expiration manager 250 and security manager 305. Security manager 305 includes at least expiring credentials 130(1)-(N) and compromised credentials 310(1)-(N). As noted, inadvertently expired credentials present a significant cybersecurity risk in developer lab environments. The time period between a credential expiring and the time required to realize such expiration let alone the time required to request and receive new replacement credentials can be a dangerous and potent time period for malicious attacks. A malicious actor 305 can insert malicious code or other types of malware into application code during this vulnerability window unintentionally exposed by inadvertently expired credentials.

In one embodiment, security manager 305 determines that an existing credential (e.g., existing credential 150(1)) has been compromised (e.g., compromised credential 310(1)) and generates a honeypot (e.g., a deception or decoy computing system) with an instantiation of web application 160 (e.g., web application 160' in honeypot 320 as shown in FIG. 3B). Security manager 305 then sends a request to re-direct network sent to third-party server 315 using compromised credential 310(1) (e.g., existing credential 150(1) that has been compromised) to web application 160' in honeypot 320 (from web application 160 in third-party server 315). Therefore, security manager 305 causes access to be permitted to web application 160 only after new credential 135(1) has been received within the expiration period.

In certain embodiments, security manager 305 compares expiring credentials 130(1)-(N) with compromised credentials 310(1)-(N) prior to initiation of a credential renewal process (integrated or non-integrated). For example, security manager 305 can determining that an expiring credential that is subject of an upcoming credential renewal request is a compromised credential. In existing developer lab environments, a risk exists that an existing credential which is a compromised credential is permitted to be renewed (or is renewed), while the underlying compromise has not been discovered. In these situations, a malicious actor can get hold of a renewed or new credential and can therefore continue a malicious attack even after a given credential naturally expires (which, under normal circumstances, would have foreclosed the possibility of future malicious attacks at the moment of credential expiration).

Therefore, in some embodiments, security manager 305 configures credential management server 105 to generate a webhook that obfuscates the identity of an expiring credential that has been compromised in a credential renewal request that is transmitted to application server 155(1). For example, the credential renewal request can include a request for new credentials for multiple expiring credentials (which includes the expiring credential that has been compromised). Because only security manager 305 knows which expiring credential has been compromised, the new credentials returned by third-party server 315 can be assigned to expiring credentials by security manager 305 while excluding (or deleting) the new credential for the expiring and compromised credential. Without an association between an expiring and compromised credential and a renewed credential, a malicious attack can be neutralized (or deviated to a honeypot) without providing a malicious attack further attack possibilities with freshly renewed credentials.

In certain embodiments, security manager 305 can configure webhooks to not only obfuscate the identity of an expiring credential that has been compromised, but can also configure webhooks to request that a null value or a random value be returned as a "renewed" credential for the expiring credential that has been compromised. This "fake" null/random value can be provided to a malicious attacker as a new credential to deceive the malicious attacker into thinking that they have obtained freshly renewed credentials (e.g., by being tied to a fictious developer account in credential store 145). A configured honeypot can then gather attack telemetry data (e.g., attack identity, exploits used, and the like) without being constrained by expiring credentials that might give away the honeypot as a decoy computing system.

Example Credential Management Table

Figure 4:
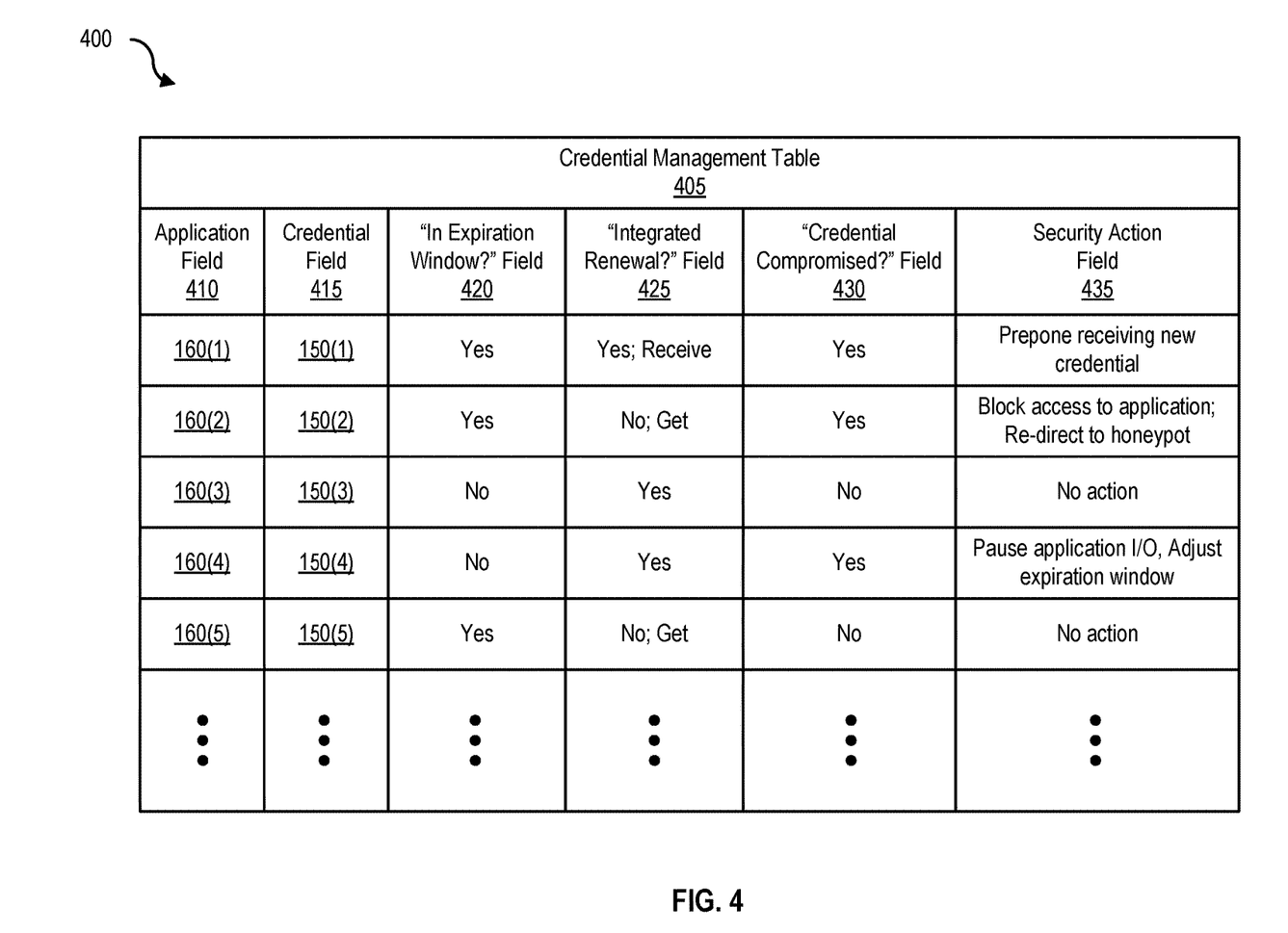
FIG. 4 is a table 400 and illustrates a credential management table, according to one embodiment of the present disclosure.

FIG. 4 is a table 400 and illustrates a credential management table 405, according to one embodiment. Credential management table 405 includes at least an application field 410, a credential field 415, an "in expiration window?" field 420, an "integrated renewal?" field 425, a "credential compromised?" field 430, and a security action field 435. The security actions noted in security action field 435 can be performed (or caused to be performed) by security manager 305, as shown in FIG. 3B.

In one embodiment, web application 160(1) with existing credential 150(1) is in an expiration window (e.g., existing credential 150(1) is (now) expiring credential 130(1), whose expiration time and date is approaching, based on a pre-determined threshold period). Integrated renewal 235 determines that web application 160(1) is integrated with credential management server 105 and that new credentials can be received seamlessly from application server 155(1). However, security manager 305 intervenes and determines that expiring credential 130(1) has been compromised and instructs (or causes) credential management server 105 to prepone (the) receiving of new credentials from application server 155(1) (e.g., to cut short and/or neutralize any ongoing malicious attacks upon the receiving of the new credentials). For example, instead of taking advantage of the full credential renewal window (e.g., up until the moment of actual credential expiration), a credential renewal request for the compromised expiring credential can be preponed, resulting in a diminished vulnerability window and significantly reducing the available time for a malicious attack to succeed.

In another embodiment, web application 160(2) with existing credential 150(2) is in an expiration window. Un-integrated renewal 240 determines that web application 160(2) is not integrated with credential management server 105 and that new, renewed, or updated credentials have to be retrieved from application server 155(2). However, because existing credential 150(2) has been compromised, security manager 305 instructs application server 155(2) to block input/output (I/O) access to web application 160(2) and causes re-direction of network traffic from web application 160(2) to a (generated) honeypot (e.g., and to an instantiation of web application 160(2), web application 160(2)').

In some embodiments, web application 160(3) is not in an expiration window (e.g., existing credential 150(3) is not expiring (soon) based on a pre-determined threshold period). Integrated renewal 235 determines that web application 160(3) is integrated with credential management server 105, but security manager 305 determines that existing credential 150(3) has not been compromised. Therefore, in this example, security manager 305 takes no action.

In other embodiments, web application 160(4), like web application 160(3) is not in an expiration window and is configured for integrated renewal. However, unlike existing credential 150(3), existing credential 150(4) has been compromised. Therefore, in this example, security manager 305 pauses application I/O operations of web application 160(4) and adjusts the expiration window (e.g., significantly shortens the expiration window causing existing credential 150(4) to expire immediately). When existing credential 150(4) is (eventually) renewed (e.g., in an integrated or un-integrated manner), the credential renewal process is performed by obfuscating the identity of existing credential 150(4), requesting multiple new credentials from application server 155(4), performing credential matching on the requesting side (e.g., by credential management server 105), and/or by using other methodologies to ensure that a malicious attacker does not correlate a new credential to an expired or expiring (but compromised) credential.

In certain embodiments, web application 160(5) with existing credential 150(5) is in an expiration window. Because un-integrated renewal requires the retrieval of credentials from application server 155(5) and because existing credential 150(5) has not been compromised, un-integrated renewal 240 retrieves a new credential to replace existing credential 150(5) without triggering security manager 305 into taking a security action.

Example Processes for Continuous Credential Renewal

Figure 5:
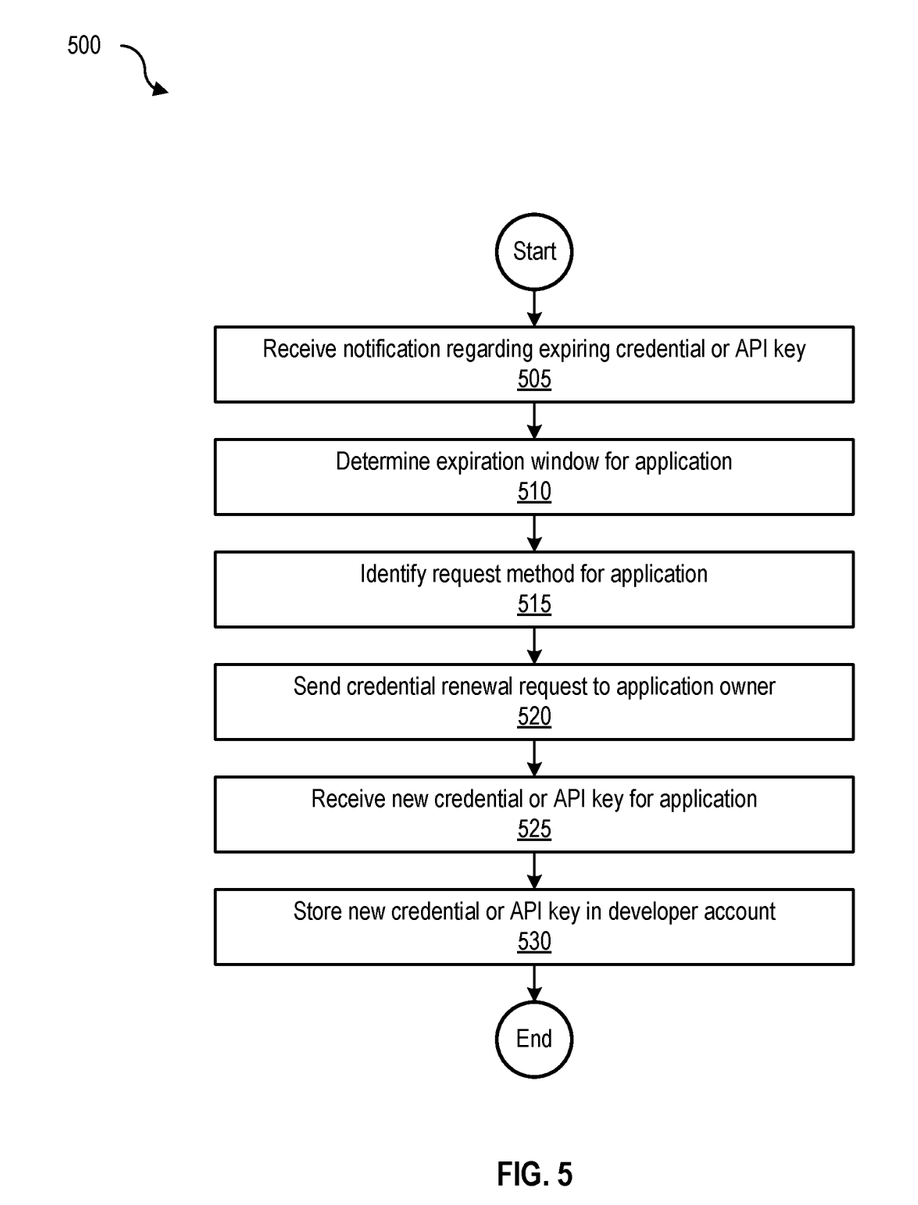
FIG. 5 is a flowchart 500 and illustrates a process for automatically renewing credentials for integrated applications, according to one embodiment of the present disclosure.

FIG. 5 is a flowchart 500 and illustrates a process for automatically renewing credentials for integrated applications, according to one embodiment. The process begins at 505 by receiving a notification regarding an expiring credential or API key (e.g., from a third-party application server, a credential store, or a credential management table). At 510, the process determines an expiration window for an application (or component, service, automation, or dependency thereof subject to the expiring credential or API key). As noted, the expiration time and date for a given credential or API key can be received when the credential or API key is created or generated (e.g., by a third-party product vendor).

At 515, the process identifies a request method for the application (e.g., a HTTP POST request method, among others), and at 520, sends a credential renewal request to the application owner (e.g., by utilizing a configured and customized webbook to an application server hosting a web application that is subject to the expiring credential). At 525, the process receives a new (e.g., updated or renewed) credential or API key for the application, and ends at 530 by storing the new credential or API key in the (corresponding) developer account.

Figure 6:
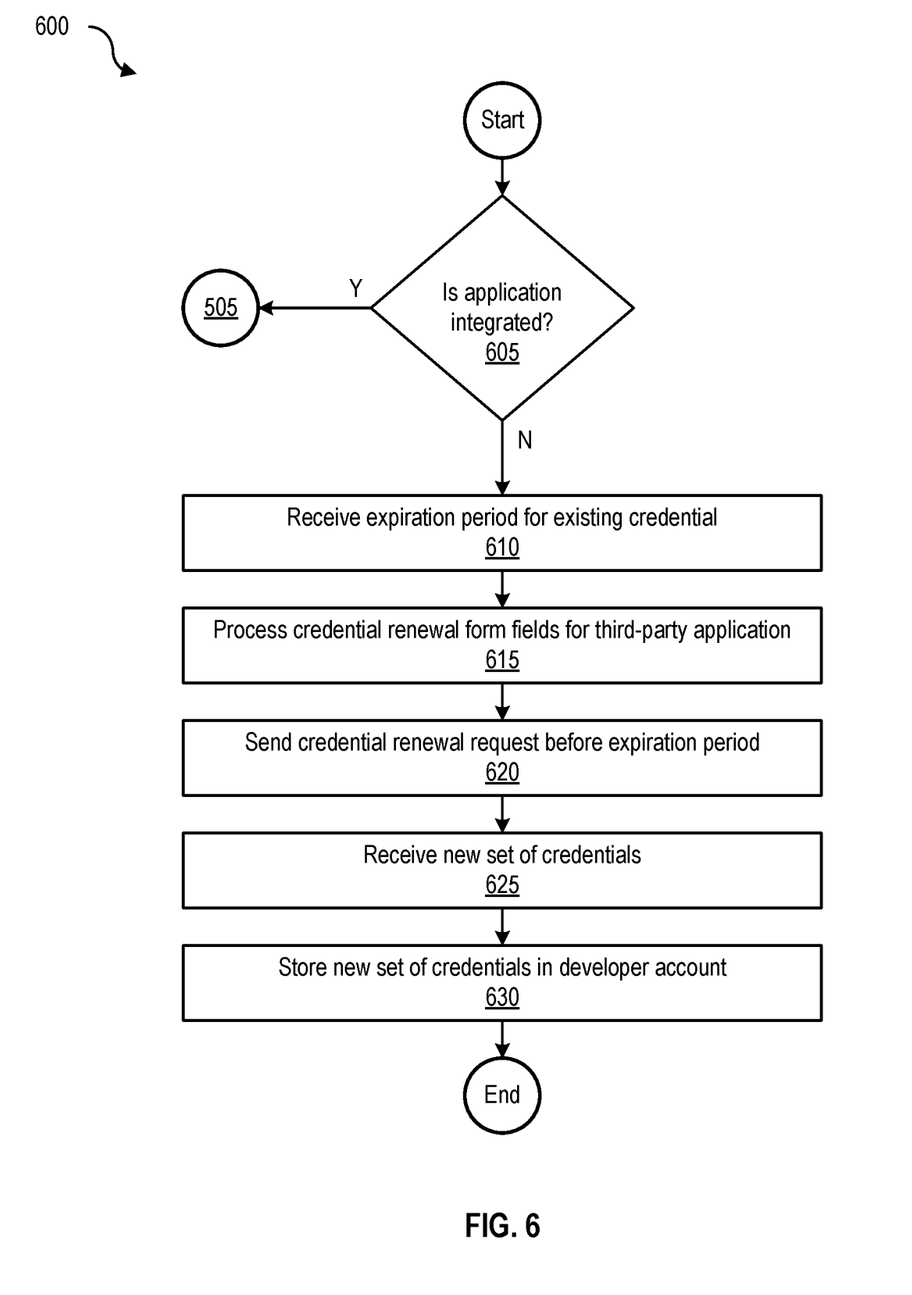
FIG. 6 is a flowchart 600 and illustrates a process for automatically renewing and storing credentials for non-integrated applications, according to one embodiment of the present disclosure.

FIG. 6 is a flowchart 600 and illustrates a process for automatically renewing and storing credentials for non-integrated applications, according to one embodiment. The process begins at 605 by determining if an application is integrated. If the application is integrated, the process moves to step 505 of FIG. 5. However, if the application is not integrated, the process, at 610, receives an expiration period (window) for an existing credential (e.g., three weeks, two weeks, one month, and the like), and at 615, processes credential renewal form fields for the third-party application (e.g., for information and other metadata required to successfully request, retrieve, or obtain new/updated/renewed credentials).

At 620, the process sends a credential renewal request before (the end of) the expiration period (e.g., one week before a two week expiration period window to ensure that new and renewed credentials are received prior to the actual expiration of existing credentials), and at 625, receives a new set of credentials (e.g., from a third-party product vendor who manages application server 155(1), and the like). The process ends at 630 by storing the new set of credentials in a developer account (e.g., in credential store 145 of cloud 140).

Figure 7:
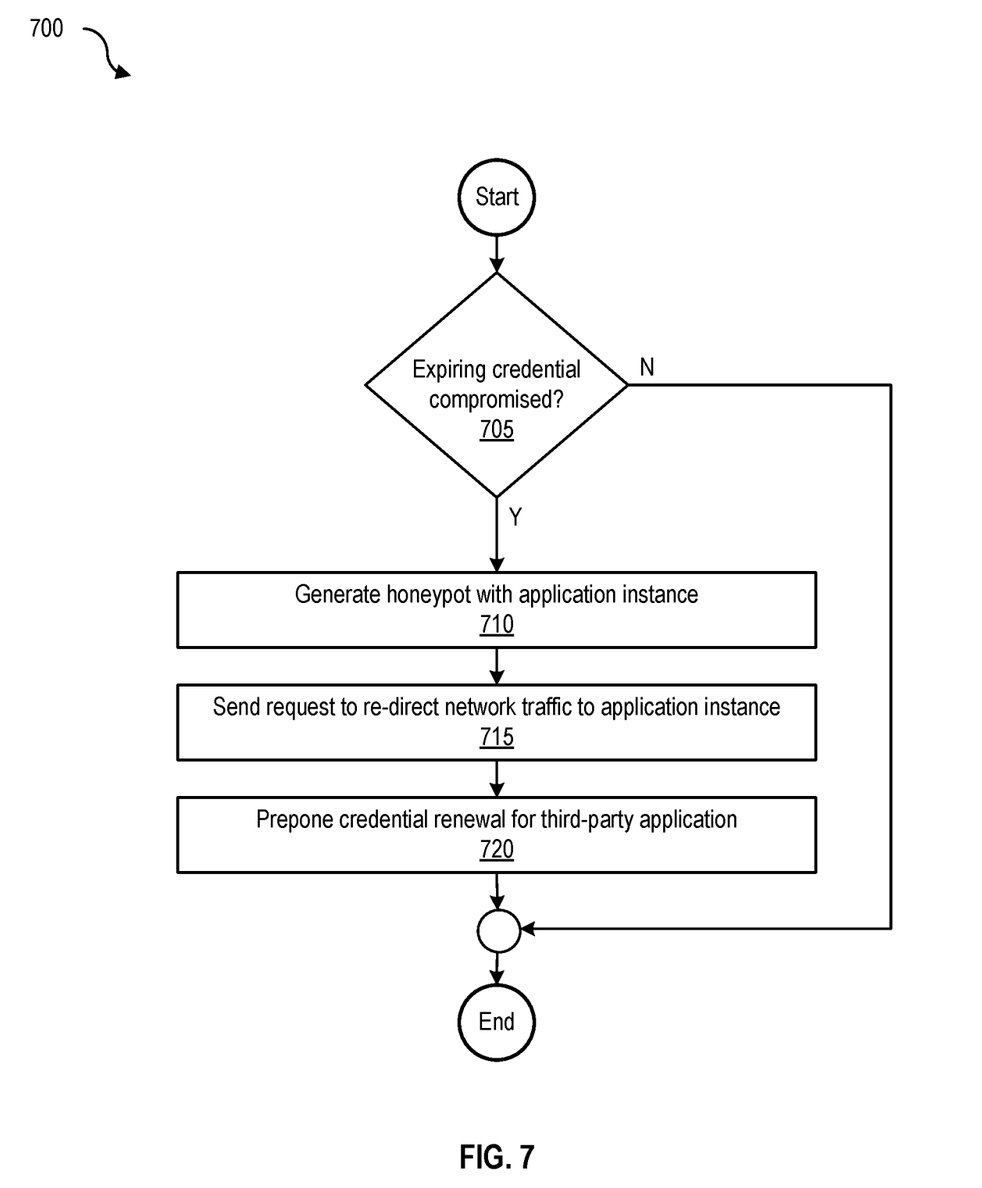
FIG. 7 is a flowchart 700 and illustrates a process for managing security risks during credential renewal, according to one embodiment of the present disclosure.

FIG. 7 is a flowchart 700 and illustrates a process for managing security risks during credential renewal, according to one embodiment. The process begins at 705 by determining if an expiring credential has been compromised. If an expiring credential has not been compromised, the process ends. However, if an expiring credential has been compromised, the process, at 710, generates a honeypot with an application instance (e.g., an instance of an application that is subject to a current or scheduled credential renewal operation and whose existing and expiring credentials have been compromised). At 715, the process sends a request to re-direct network traffic to the application instance (e.g., to an application server hosting the application) and ends at 720 by preponing (the) credential renewal (process) for (the) third-party application.

Therefore, the methods, systems, and processes disclosed herein automatically renew credentials or API keys associated with developer accounts in developer lab environments. Renewing credentials in this manner without the need for developer intervention not only alleviates unplanned, costly, and arduous downtime with respect to application usage that revolves around consumption of third-party vendors and products, but also leads to significant cost savings (both in terms of human resources and financial capital).

Further, the methods, systems, and processes disclosed herein also ameliorate cybersecurity-related risks caused (or exposed) by inadvertently expired credentials in developer lab environments by periodically refreshing credentials and proactively dealing with compromised credentials. It will be appreciated that continuous renewal of credentials and API keys prior to expiration in developer lab environments also leads to robust functioning of collaborative and dispersed application development and permits developers to confidently incorporate third-party vendor products without being caught off-guard by unexpected failures.

Example Computing Environment

Figure 8:
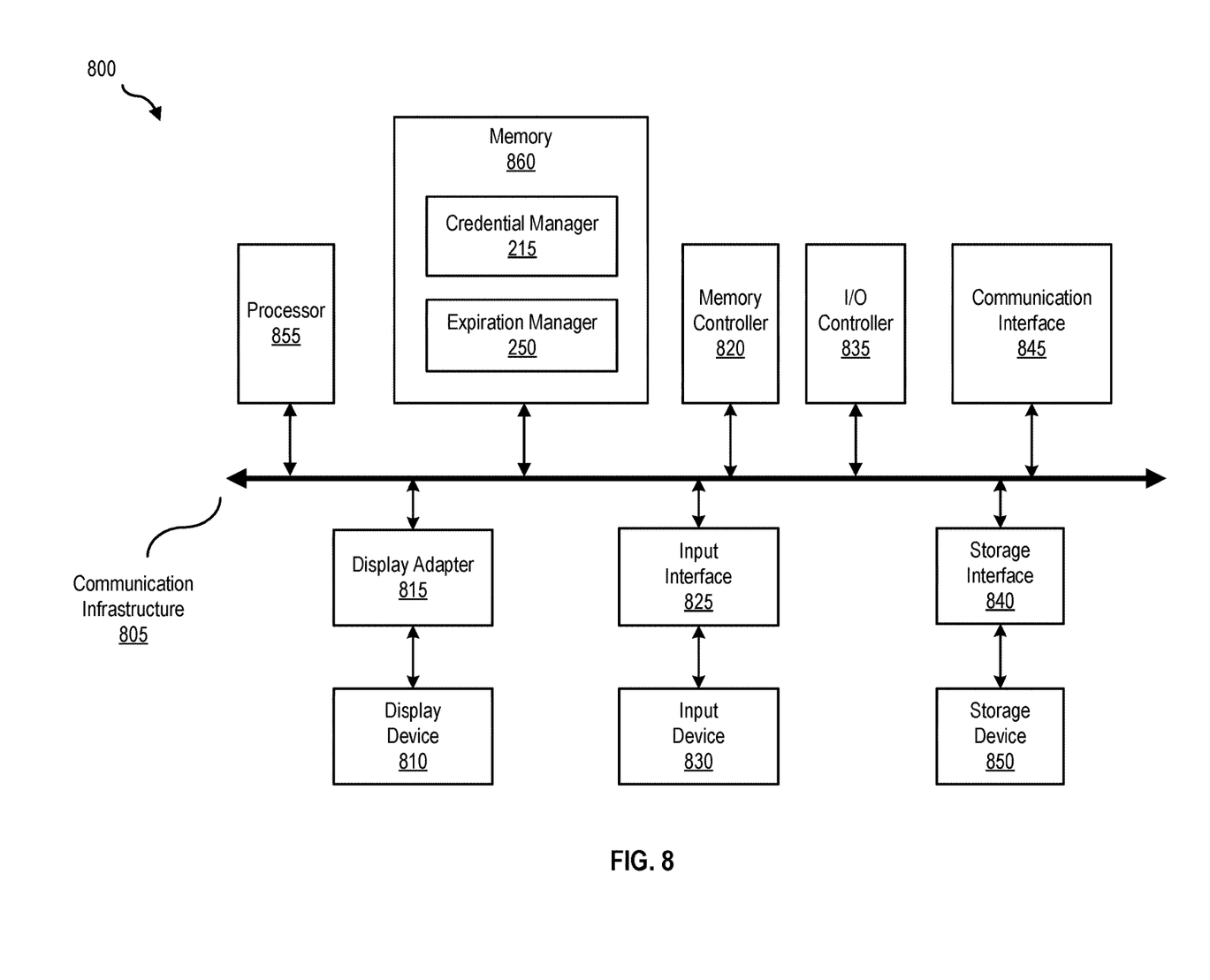
FIG. 8 is a block diagram 800 of a computing system, illustrating a credentials manager and an expiration manager implemented in software, according to one embodiment of the present disclosure.

FIG. 8 is a block diagram 800 of a computing system, illustrating how credential manager 215 and/or expiration manager 250 can be implemented in software, according to one embodiment. Computing system 800 can include credential management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes credentials manager 215 and/or expiration manager 250, computing system 800 becomes a special purpose computing device that is configured to continuously renew credentials in application development and testing environments.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, random access memory (RAM), read only memory (ROM), flash memory, or any other suitable memory device. In certain embodiments computing system 800 may include both a volatile memory unit and a non-volatile storage device. In one example, program instructions implementing credential manager 215 and/or expiration manager 250 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
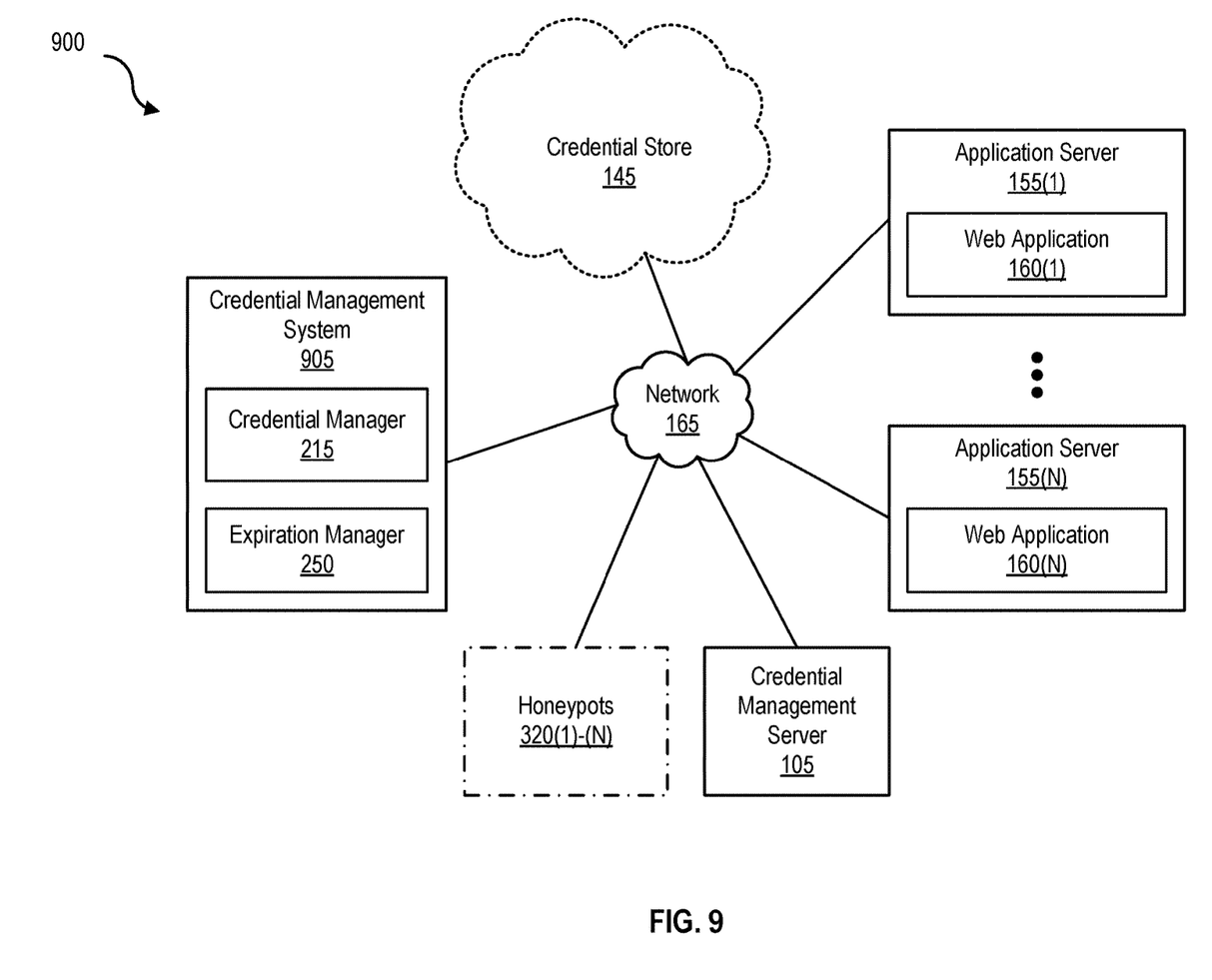
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 165 generally represents any type or form of computer network or architecture capable of facilitating communication between credential management system 905, credential management server 105, application servers 155(1)-(N), credential store 145, and/or honeypots 320(1)-(N). For example, network 165 can be a Wide Area Network (WAN) (e.g., the Internet) or a Local Area Network (LAN). In certain embodiments, a communication interface, such as communication interface 845 in FIG. 8, may be used to provide connectivity between credential management system 905, credential management server 105, application servers 155(1)-(N), credential store 145, and/or honeypots 320(1)-(N), and network 165.

Credential manager 215 and/or expiration manager 250 may be part of credential management server 105, or may be separate. If separate, credential management system 905 and credential management server 105 may be communicatively coupled via network 165. All or a portion of embodiments may be encoded as a computer program and loaded onto and executed by credential management system 905 and/or credential management server 105, and may be stored on credential management system 905 and/or credential management server 105, and distributed over network 165.

In some examples, all or a portion of credential management system 905 and/or credential management server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, credential manager 215 and/or expiration manager 250 may transform the behavior of credential management system 905 and/or credential management server 105 to perform continuous renewal of credentials in developer lab environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
receiving, via a webhook, a notification indicating that an existing credential associated with a developer account of a third-party application will expire within an expiration period;
sending a credential renewal request for a new set of credentials for the developer account using a request method specified for the third-party application;
receiving, via the webhook, the new set of credentials for the developer account within the expiration period;
determining that the existing credential has been compromised prior to being renewed within the expiration period; and
in response to determining that the existing credential has been compromised prior to being renewed within the expiration period, adjusting the expiration period to cause the existing credential to expire immediately, and
obfuscating the existing credential to ensure that the existing credential is not correlated to the new set of credentials.

2. The computer-implemented method of claim 1, further comprising:
determining that the third-party application is unintegrated;
receiving an input comprising the expiration period for the existing credential;
processing a credential renewal form for the third-party application; and
sending the credential renewal request requesting the new set of credentials a pre-determined amount of time before the expiration period ends.

3. The computer-implemented method of claim 2, further comprising:
receiving the new set of credentials; and
storing the new set of credentials in the developer account.

4. The computer-implemented method of claim 1, wherein
the new set of credentials are received via an Application Programming Interface (API).

5. The computer-implemented method of claim 1, wherein
the request method comprises POST.

6. The computer-implemented method of claim 2, wherein
the expiration period is received when the existing credential is created.

7. The computer-implemented method of claim 1, further comprising:
generating a honeypot with an instantiation of the third-party application;
sending a request to re-direct network traffic sent to the third-party application using the existing credential to the instantiation of the third-party application in the honeypot for remainder of the expiration period; and
causing access to be permitted to the third-party application only after the new set credential have been received within the adjusted expiration period.

8. A non-transitory computer readable storage medium comprising program instructions executable to:
receive, via a webhook, a notification indicating that an existing credential associated with a developer account of a third-party application will expire within an expiration period;
send a credential renewal request for a new set of credentials for the developer account using a request method specified for the third-party application;
receive, via the webhook, the new set of credentials for the developer account within the expiration period;
determine that the existing credential has been compromised prior to being renewed within the expiration period; and
in response to determining that the existing credential has been compromised prior to being renewed within the expiration period,
adjust the expiration period to cause the existing credential to expire immediately, and
obfuscate the existing credential to ensure that the existing credential is not correlated to the new set of credentials.

9. The non-transitory computer readable storage medium of claim 8, further comprising:
determining that the third-party application is unintegrated;
receiving an input comprising the expiration period for the existing credential;
processing a credential renewal form for the third-party application;
sending the credential renewal request requesting the new set of credentials a pre-determined amount of time before the expiration period ends;
receiving the new set of credentials; and
storing the new set of credentials in the developer account.

10. The non-transitory computer readable storage medium of claim 8, wherein
the request method comprises POST, and
the expiration period is received when the existing credential is created.

11. The non-transitory computer readable storage medium of claim 8, further comprising:
generating a honeypot with an instantiation of the third-party application;
sending a request to re-direct network traffic sent to the third-party application using the existing credential to the instantiation of the third-party application in the honeypot for remainder of the expiration period; and
causing access to be permitted to the third-party application only after the new set credential have been received within the adjusted expiration period.

12. A system comprising:
one or more processors; and
a memory coupled to the one or more processors, wherein the memory stores program instructions executable by the one or more processors to:
receive, via a webhook, a notification indicating that an existing credential associated with a developer account of a third-party application will expire within an expiration period;
send a credential renewal request for a new set of credentials for the developer account using a request method specified for the third-party application;
receive, via the webhook, the new set of credentials for the developer account within the expiration period;
determine that the existing credential has been compromised prior to being renewed within the expiration period; and
in response to determining that the existing credential has been compromised prior to being renewed within the expiration period,
adjust the expiration period to cause the existing credential to expire immediately, and
obfuscate the existing credential to ensure that the existing credential is not correlated to the new set of credentials.

13. The system of claim 12, further comprising:
determining that the third-party application is unintegrated;
receiving an input comprising the expiration period for the existing credential;
processing a credential renewal form for the third-party application;
sending the credential renewal request requesting the new set of credentials a pre-determined amount of time before the expiration period ends;
receiving the new set of credentials; and
storing the new set of credentials in the developer account.

14. The system of claim 12, wherein
the new set of credentials are received via an Application Programming Interface (API),
the request method comprises POST, and
the expiration period is received when the existing credential is created.

15. The system of claim 12, further comprising:
generating a honeypot with an instantiation of the third-party application;
sending a request to re-direct network traffic sent to the third-party application using the existing credential to the instantiation of the third-party application in the honeypot for remainder of the expiration period; and
causing access to be permitted to the third-party application only after the new set credential have been received within the adjusted expiration period.

\* \* \* \* \*